2 Sheets—Sheet 1.
T. B. OSBORNE.
Middlings-Purifier.
No. 224,719. Patented Feb. 17, 1880.
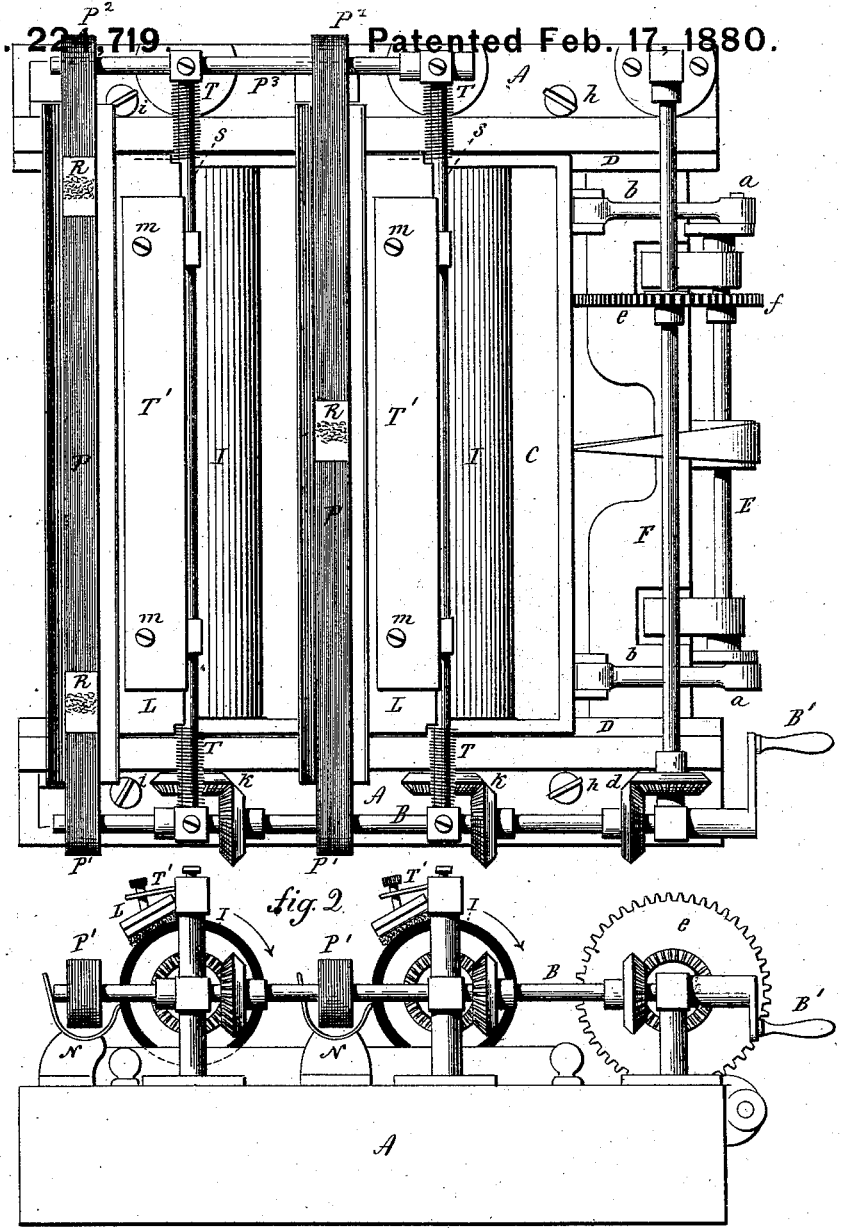
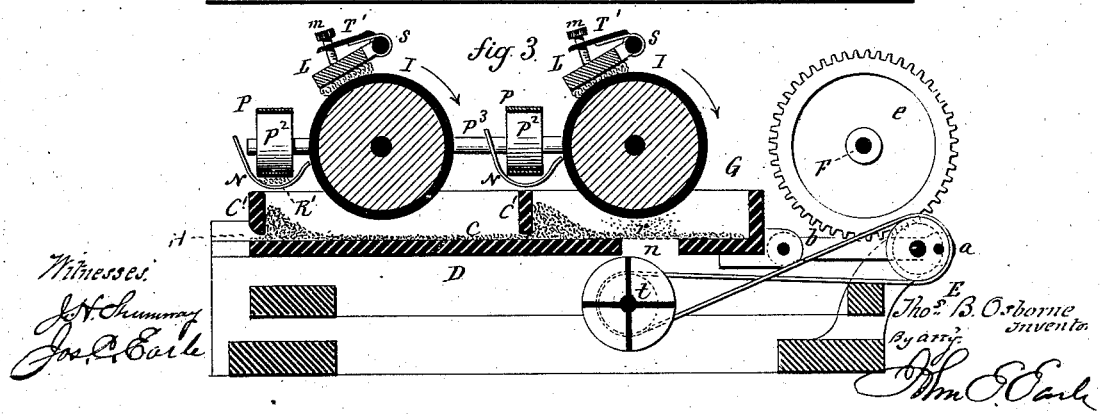

2 Sheets—Sheet 2.
T. B. OSBORNE.
Middlings-Purifier.
No. 224,719. Patented Feb. 17, 1880.
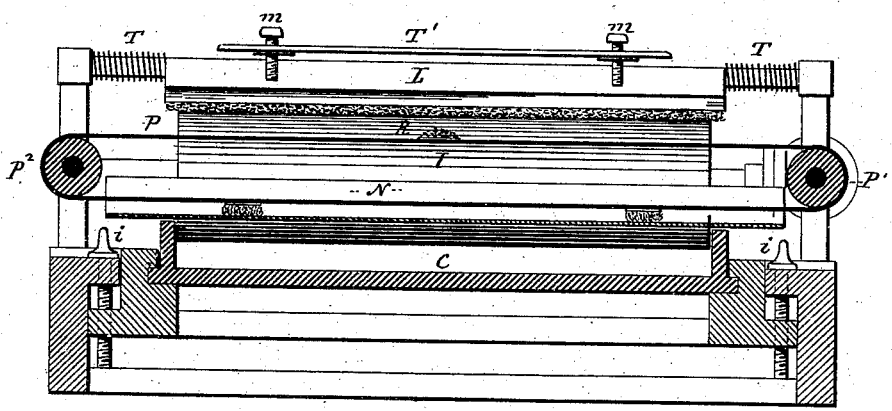
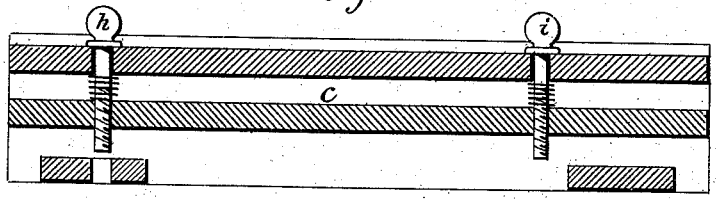

UNITED STATES PATENT OFFICE.

THOMAS B. OSBORNE, OF NEW HAVEN, CONNECTICUT, ASSIGNOR OF ONE-HALF OF HIS RIGHT TO KINGSLAND SMITH, OF NEW YORK, N. Y.

MIDDLINGS-PURIFIER.

SPECIFICATION forming part of Letters Patent No. 224,719, dated February 17, 1880.

Application filed December 3, 1879.

*To all whom it may concern:*

Be it known that I, THOS. B. OSBORNE, of New Haven, in the county of New Haven and State of Connecticut, have invented a new Improvement in Middlings-Purifiers; and I do hereby declare the following, when taken in connection with the accompanying drawings and the letters of reference marked thereon, to be a full, clear, and exact description of the same, and which said drawings constitute part of this specification, and represent, in—

Figure 1, a top or plan view; Fig. 2, end view; Fig. 3, transverse section; Fig. 4, longitudinal section through one of the troughs; and Fig. 5, transverse section through the receiver-adjusting device.

This invention relates to an improvement in devices for purifying ground grain, such as wheat, &c., the object being to remove all the particles which depreciate the quality of the flour; and the invention consists in the process and in the construction of the apparatus, as hereinafter described, and more particularly recited in claims.

A represents the bed or frame of the machine, and on which the operative mechanism is arranged; B, the driving-shaft, to which power may be applied in any known or convenient manner. (Here represented as by a crank, B'.) C is a receiver for the ground material, and is arranged so as to be moved on guides D, and a rapid reciprocating movement is imparted to it by means of cranks $a$ and pitman-connections $b$. The said cranks are arranged on a longitudinal shaft, E, to which a rotary motion is imparted through an intermediate shaft, F, in connection with the driving-shaft, by bevel-gears $d$, and with the shaft E by pinions $e f$, so that as the driving-shaft is rotated a rapid reciprocating movement is imparted to the receiver C.

The guides D, which support the receiver C, are arranged so as to be adjusted relatively to the rolls by means of screws $h\ h$ and $i\ i$. The bed of the machine is placed in an inclined position, or the guides D may be inclined, so as to give the receiver C an inclination downward from the receiving-point G to the discharge H, and so that the grain delivered into the receiver at G will, by the constant agitation or shaking of the receiver, work gradually along until it passes out at the discharge H. (See Fig. 3.) The method of adjustment is shown in Fig. 4.

Longitudinally over the receiver several rolls, I, are arranged parallel with each other and connected to the driving-shaft by bevel-gears K, so as to be revolved in the direction denoted by the arrows, Fig. 3. These rolls run near the surface of the ground material in the receiver, and they are made from, or their surfaces coated with, hard rubber or equivalent material capable of being electrified or to present an electrified surface.

Above each roll, or at some point above the receiver, is a pad, L, presenting to each roll, and so as to bear upon it, a cushion or surface of wool or equivalent material which will generate more or less electricity in consequence of the hard rubber rubbing against the said cushion, and giving to the rolls an electrified surface and an attractive power which will take from the surface of the ground material the lighter particles, such particles rising and attaching themselves to the rolls by the attractive power thus generated, and, adhering to the rolls, they ride upon the surface until they strike the cushion L above, or some other obstruction, then, being detached, will drop into troughs N below, which are in such relative position to the rolls as to catch the particles when they drop therefrom. The said troughs extend over the receiver parallel with the rolls.

To discharge the material deposited in the troughs an endless band, P, is arranged longitudinally over each of the troughs, running on a pulley, P', on the driving-shaft and over a corresponding pulley, P², on a shaft, P³, at the other end of the machine. These bands are provided with one or more sweeps, R, which run in close contact with the troughs, and so as to draw or sweep the material collected in the trough to and deliver it from one end.

The cushions L are hung on the shaft S, and springs (here represented as spiral springs) T act upon the cushion with a tendency to raise the cushion from the roll.

In order to adjust the friction of the cushion on the roll a plate, T', is rigidly attached to the shaft and extends therefrom over the cushion, as seen in Figs. 2 and 3, and through these plates T adjusting-screws m are arranged, more or less in number, to bear directly upon the back of the cushion, and so that by turning the screws inward or downward the cushion is made to press upon the roll to the desired degree, or turning the screws in the opposite direction will accordingly relieve the friction.

The springs may be dispensed with, and a positive engagement of the cushion made with the screws, so that turning the screws in one direction will increase the pressure and turning the screws in the opposite direction will relieve the pressure.

While the agitation of the receiver will tend to throw the lighter particles, which it is desirable to remove, to the surface, thence to be removed by the electrified surface, and which in some cases may be sufficient, the process is facilitated by a blast introduced from below, which will tend to blow the lighter particles upward through and above the mass or heavier particles. To this end I make an opening, n, (see Fig. 3,) and cover it with a fine open mesh, r, so fine and of such a nature that the ground material will not sift through it, but yet so that air may be readily forced through; then below the opening n a blast is arranged to discharge into said opening, (here represented as by a blower or fan, t,) arranged directly below the opening, but the necessary blast may be derived from any other source. This opening should be arranged near the roll, and so that the particles raised by the blast will be more readily taken by the roll—that is to say, the blast not only brings the lighter particles to the surface, but drives them to the roll or electrified surface, where they are caught and retained.

The blast should be regulated according to the quantity or nature of the material.

As a further aid in bringing to the surface the lighter particles a bar, C', extends across the receiver in front of each roll, but so as to leave a slight opening between the bar and the bottom of the receiver, as seen in Fig. 3. The opening between the bar and the bottom is less than the depth of the material in the receiver; hence the constantly advancing material will bank up against the bars, as indicated in Fig. 3, and roll over and over against the partition, and increasing the surface upon which the roll may act, the material passing from the division under one roll through the opening below the bar into the next division, and so on until finally discharged.

While I have described the attracting-surfaces as revolving rolls, it will be readily understood that this surface may be flat, or otherwise presented or moved so as to receive and discharge the particles by their movement.

The number of these attracting surfaces or rolls may be increased to any desirable extent in one and the same machine, the receiver being accordingly extended.

Instead of a reciprocating receiver, other devices may be employed—for instance, an endless apron, onto which the grain shall be delivered and carried beneath the rolls. In that case a different agitator would be required—for instance, beaters to strike lightly upon the under side of the apron.

I therefore do not wish to be understood as limiting my invention to the particular construction or arrangement of parts as shown in the accompanying illustration; but What I do claim is—

1. The process herein described for purifying flour, consisting in passing the ground material, and at the same time agitating it, beneath movable electrified surfaces, substantially as described.

2. The combination of a receiver for the ground material, arranged and operating to agitate the ground material passing thereon, with one or more movable electrified surfaces above the surface of the ground material passing in the receiver, substantially as described.

3. The combination of a receiver for the ground material, arranged and operating to agitate the ground material passing thereon, with one or more movable electrified surfaces above the surface of the ground material passing in the receiver, and a blast arranged to discharge a current of air through the ground material, substantially as described.

4. The combination of a receiver for the ground material, arranged and operating to agitate the ground material passing thereon, with one or more movable electrified surfaces above the surface of the ground material passing in the receiver, and an adjustable cushion to regulate the power of the attracting-surfaces, substantially as described.

5. The combination of a receiver for the ground material, arranged and operating to agitate the ground material passing thereon, with one or more movable electrified surfaces above the surface of the ground material passing in the receiver, and troughs to receive the particles from the electrified surfaces, substantially as described.

6. The combination of a receiver for the ground material, arranged and operating to agitate the ground material passing thereon, with one or more movable electrified surfaces above the surface of the ground material passing in the receiver, troughs to receive the particles from the electrified surfaces, and moving sweeps to discharge the material from the troughs, substantially as described.

THOMAS B. OSBORNE.

Witnesses:
JAS. C. EARLE,
J. H. SHUMWAY.